US008248272B2

(12) United States Patent
Arnold et al.

(10) Patent No.: US 8,248,272 B2
(45) Date of Patent: Aug. 21, 2012

(54) DETECTING TARGETS IN ROADWAY INTERSECTIONS

(75) Inventors: David V. Arnold, Provo, UT (US); Bryan R. Jarrett, Pleasant Grove, UT (US); Thomas W. Karlinsey, American Fork, UT (US); Ryan L. Smith, Salem, UT (US); Jonathan L. Waite, Orem, UT (US)

(73) Assignee: WaveTronix, Lindon, UT (US)

(*) Notice: Subject to any disclaimer, the term of this patent is extended or adjusted under 35 U.S.C. 154(b) by 255 days.

(21) Appl. No.: 12/502,965

(22) Filed: Jul. 14, 2009

(65) Prior Publication Data

US 2010/0141479 A1    Jun. 10, 2010

Related U.S. Application Data

(63) Continuation-in-part of application No. 11/614,250, filed on Dec. 21, 2006, now Pat. No. 7,889,097, and a continuation-in-part of application No. 11/264,339, filed on Oct. 31, 2005, now Pat. No. 7,573,400.

(60) Provisional application No. 61/185,005, filed on Jun. 8, 2009.

(51) Int. Cl.
*G08G 1/01* (2006.01)

(52) U.S. Cl. ........ 340/936; 340/933; 340/916; 340/917; 342/454

(58) Field of Classification Search .................. 340/936, 340/907, 933, 916, 917, 941, 942, 943, 909, 340/910, 935, 937; 343/700 MS, 729, 742; 342/90, 454
See application file for complete search history.

(56) References Cited

U.S. PATENT DOCUMENTS

| | | | |
|---|---|---|---|
| 3,737,857 | A | 6/1973 | Carman |
| 3,819,919 | A | 6/1974 | McGunigle |
| 4,053,741 | A | 10/1977 | Ainoya |
| 4,167,330 | A | 9/1979 | Haville |
| 4,180,817 | A | 12/1979 | Sanford |
| 4,244,026 | A | 1/1981 | Dickey |
| 4,258,351 | A | 3/1981 | Shigeta |
| 4,317,117 | A | 2/1982 | Chasek |
| 4,430,636 | A | 2/1984 | Bruce |
| 4,658,334 | A | 4/1987 | McSparran |
| 4,659,982 | A | 4/1987 | Van de Velde |
| 4,700,191 | A | 10/1987 | Mano |
| 4,851,855 | A | 7/1989 | Tsukamoto |
| 4,866,438 | A | 9/1989 | Knisch |

(Continued)

FOREIGN PATENT DOCUMENTS

DE    4223119    6/1993
(Continued)

OTHER PUBLICATIONS

International Search Report for PCT/US2010/037596 dated Aug. 19, 2010.

(Continued)

*Primary Examiner* — Toan N Pham
(74) *Attorney, Agent, or Firm* — Workman Nydegger (57) ABSTRACT

The present invention extends to methods, systems, and computer program products for detecting targets in roadway intersections. Transmit antennas transmit signals into a roadway intersection. Receive antennas receive corresponding signal reflections off objects in the roadway. The reflections correspond to two dimensional image data for the roadway intersection. The reflections are conditioned for compatibility with a processor. The processor processes the condition reflections into a two dimensional image of targets in the roadway intersection.

21 Claims, 8 Drawing Sheets

U.S. PATENT DOCUMENTS

| | | |
|---|---|---|
| 4,908,615 A | 3/1990 | Bayraktaroglu |
| 4,914,448 A | 4/1990 | Otsuka |
| 4,914,449 A | 4/1990 | Fukuzawa |
| 4,967,201 A | 10/1990 | Rich |
| 4,977,406 A | 12/1990 | Tsukamoto |
| 5,066,950 A | 11/1991 | Schweitzer |
| 5,122,961 A | 6/1992 | Toyama |
| 5,161,107 A | 11/1992 | Mayeaux |
| 5,204,682 A | 4/1993 | Beasley |
| 5,243,528 A | 9/1993 | Lefebvre |
| 5,262,783 A | 11/1993 | Philpott |
| 5,278,563 A | 1/1994 | Spiess |
| 5,339,081 A | 8/1994 | Jefferis et al. |
| 5,402,346 A | 3/1995 | Lion |
| 5,423,080 A | 6/1995 | Perret |
| 5,448,484 A | 9/1995 | Bulllock |
| 5,504,490 A | 4/1996 | Brendle |
| 5,504,659 A | 4/1996 | Acatay |
| 5,510,990 A | 4/1996 | Hibino |
| 5,555,036 A | 9/1996 | Harnett |
| 5,572,450 A | 11/1996 | Worthy |
| 5,581,249 A | 12/1996 | Yoshida |
| 5,621,645 A | 4/1997 | Brady |
| 5,663,720 A | 9/1997 | Weissman |
| 5,694,134 A | 12/1997 | Barnes |
| 5,710,565 A | 1/1998 | Shirai |
| 5,714,965 A | 2/1998 | Taguchi |
| 5,716,301 A | 2/1998 | Wild |
| 5,721,194 A | 2/1998 | Yandrofski et al. |
| 5,748,153 A | 5/1998 | McKinzie |
| 5,757,307 A | 5/1998 | Nakatani |
| 5,790,403 A | 8/1998 | Nakayama |
| 5,793,491 A | 8/1998 | Wangler et al. |
| 5,798,983 A | 8/1998 | Kuhn et al. |
| 5,821,879 A | 10/1998 | Liepmann |
| 5,862,337 A | 1/1999 | Gray |
| 5,878,367 A | 3/1999 | Lee |
| 5,884,212 A | 3/1999 | Lion |
| 5,920,280 A | 7/1999 | Okada |
| 5,926,114 A | 7/1999 | Andrews |
| 5,949,383 A | 9/1999 | Hayes |
| 5,995,900 A | 11/1999 | Hsiao |
| 6,011,515 A | 1/2000 | Radcliffe |
| 6,037,894 A | 3/2000 | Pfizenmaier et al. |
| 6,081,226 A | 6/2000 | Caldwell |
| 6,091,355 A | 7/2000 | Cadotte |
| 6,094,172 A | 7/2000 | Kascica |
| 6,114,973 A | 9/2000 | Winner et al. |
| 6,118,405 A | 9/2000 | McKinnon et al. |
| 6,124,807 A | 9/2000 | Heckeroth et al. |
| 6,160,494 A | 12/2000 | Sodi |
| 6,177,885 B1 | 1/2001 | Weil |
| 6,195,019 B1 | 2/2001 | Nagura |
| 6,195,608 B1 | 2/2001 | Berliner |
| 6,198,437 B1 | 3/2001 | Watson |
| 6,204,778 B1 | 3/2001 | Bergan |
| 6,253,162 B1 | 6/2001 | Jarman |
| 6,266,627 B1 | 7/2001 | Gatsonides |
| 6,272,443 B1 | 8/2001 | Motzko |
| 6,366,870 B2 | 4/2002 | Jarman |
| 6,373,427 B1 | 4/2002 | Hohne |
| 6,377,191 B1 | 4/2002 | Takubo |
| 6,396,435 B1 | 5/2002 | Fleischhauer |
| 6,396,437 B1 | 5/2002 | Marino |
| 6,470,262 B2 | 10/2002 | Kerner |
| 6,490,519 B1 | 12/2002 | Lapidot et al. |
| 6,556,916 B2 | 4/2003 | Waite et al. |
| 6,577,269 B2 | 6/2003 | Woodington |
| 6,614,536 B1 | 9/2003 | Doemens |
| 6,657,554 B1 | 12/2003 | Terashima |
| 6,683,557 B2 | 1/2004 | Pleva |
| 6,693,557 B2 | 2/2004 | Arnold et al. |
| 6,707,391 B1 | 3/2004 | Monroe |
| 6,707,419 B2 | 3/2004 | Woodington |
| 6,750,787 B2 | 6/2004 | Hutchinson |
| 6,781,523 B2 | 8/2004 | Matsui et al. |
| 6,812,888 B2 | 11/2004 | Drury |
| 6,816,107 B2 | 11/2004 | Pleva |
| 6,856,876 B2 | 2/2005 | Breed |
| 6,876,949 B2 | 4/2005 | Hilliard |
| 6,879,281 B2 | 4/2005 | Gresham |
| 6,888,474 B2 | 5/2005 | Sharp et al. |
| 6,959,259 B2 | 10/2005 | Vock |
| 7,089,422 B2 | 8/2006 | Huntingdon et al. |
| 7,317,406 B2 | 1/2008 | Wolterman |
| 7,324,015 B1 | 1/2008 | Allen |
| 7,327,280 B2 | 2/2008 | Bachelder et al. |
| 7,408,479 B2 | 8/2008 | Johnson |
| 7,421,334 B2 | 9/2008 | Dahlgren et al. |
| 7,426,450 B2 | 9/2008 | Arnold et al. |
| 7,427,930 B2 | 9/2008 | Arnold et al. |
| 7,501,976 B2 | 3/2009 | Manor |
| 7,573,400 B2 | 8/2009 | Arnold et al. |
| 2001/0046042 A1 | 11/2001 | Theile |
| 2004/0083037 A1 | 4/2004 | Yamane |
| 2004/0119633 A1 | 6/2004 | Oswald |
| 2005/0046597 A1 | 3/2005 | Hutchison et al. |
| 2005/0168331 A1 | 8/2005 | Gunderson |
| 2005/0231384 A1 | 10/2005 | Shimotani |
| 2005/0242306 A1 | 11/2005 | Sirota et al. |
| 2006/0287807 A1 | 12/2006 | Teffer |
| 2007/0009694 A1 | 5/2007 | Arnold et al. |
| 2007/0152869 A1 | 7/2007 | Woodington et al. |
| 2007/0208495 A1 | 9/2007 | Chapman et al. |

FOREIGN PATENT DOCUMENTS

| | | |
|---|---|---|
| EP | 0716949 | 6/1996 |
| EP | 0940690 | 3/1998 |
| EP | 0945715 | 3/1998 |
| EP | 0954049 | 4/1998 |
| EP | 0978729 | 8/1998 |
| EP | 1180758 | 2/2002 |
| FR | 2812402 | 2/2002 |
| GB | 1443701 | 7/1975 |
| JP | 4084300 | 3/1992 |
| JP | 6162387 | 6/2004 |
| WO | WO9908128 | 2/1999 |
| WO | WO0045462 | 3/2000 |
| WO | WO0113142 | 2/2001 |

OTHER PUBLICATIONS

U.S. Appl. No. 60/439,109, filed Jan. 10, 2003, Arnold et al.
U.S. Appl. No. 11/311,103, filed Dec. 19, 2005, Arnold et al.
U.S. Appl. No. 60/785,964, filed Mar. 24, 2006, Giles et al.
U.S. Appl. No. 11/614,250, filed Dec. 21, 2006, Arnold et al.
U.S. Appl. No. 11/689,441, filed Mar. 21, 2007, Giles et al.
U.S. Appl. No. 61/185,005, filed Jun. 8, 2009, Arnold et al.
U.S. Appl. No. 12/546,219, filed Aug. 24, 2009, Arnold et al.
U.S. Appl. No. 12/546,196, filed Aug. 24, 2009, Arnold et al.
U.S. Appl. No. 12/710,736, filed Feb. 23, 2010, Arnold et al.
International Search Report and Written Opinion from PCT/US2010/037602 dated Aug. 6, 2010.
UMRR: A 24GHz Medium Range Radar Platform, Smart Microwave Sensors GmbH, Jul. 25, 2003.
The UMRR 24GHz Radar Sensor Family for Short and Medium Range Applications, Smart Microwave Sensors GmbH, Apr. 8, 2008.
A 24 GHz ACC Radar Sensor, Smart Microwave Sensors GmbH, Feb. 28, 2005.
Klotz et al., "An Automotive Short Range High Resolution Pulse Radar Network," Jan. 2002.
SmarTek Acoustic Sensor—Version 1 (SAS-1), Installation and Setup Guide; Apr. 3, 2003.
University Research in Support of the Department of Transportation Program on Remote Sensing Applications in Transportation, Nov. 1999.
Cambridge Consultants; Technology at the crossroads: new radar sensor allows pedestrians and traffic to coexist; Feb. 24, 2004.
Transportation Systems Railway Grade Crossing Sensor, Aug. 17, 2007, 1 pg.
Transportation Systems Millimeter Wave Radar Traffic Sensor, AutoTrak, Aug. 17, 2004, 2 pgs.
Image Sensor for Measuring Volumes by Direction, Atsushi Saito, International Sales & Marketing Department, Social Systems Solution & Service Business Company, OMRON Corporation, Tokyo Japan, ITS World Congress, Oct. 2004, 1 pg.
Computer Vision Algorithms for Intersection Monitoring; Harini Veeraraghavan, Osama Masoud, and Nikolaos P. Papanikolopoulous, Senior Member, IEEE, IEEE Transactions on Intelligent Transportation Systems, vol. 4, No. 2, Jun. 2003.
Office Action dated Jan. 8, 2010 from U.S. Appl. No. 11/689,441.
Office Action dated Nov. 4, 2009 from U.S. Appl. No. 11/614,250.
International Search Report and Written Opinion from PCT/US2007/065711, dated Sep. 4, 2008.
"Dilemma Zone Detector (DZD): Summary Requirements" ISS & Econolite at Wavetronix, Jul. 18, 2003.
U.S. Appl. No. 12/546,219, filed Mar. 11, 2010, Notice of Allowance.
U.S. Appl. No. 12/546,219, filed Oct. 22, 2010, Notice of Allowance.
U.S. Appl. No. 12/546,219, filed Dec. 6, 2010, Notice of Allowance.
U.S. Appl. No. 11/614,250, filed Jul. 24, 2009, Office Action.
U.S. Appl. No. 11/614,250, filed Mar. 11, 2010, Notice of Allowance.
U.S. Appl. No. 11/614,250, filed Jun. 10, 2010, Notice of Allowance.
U.S. Appl. No. 11/614,250, Oct. 20, 2010, Notice of Allowance.
U.S. Appl. No. 11/614,250, filed Dec. 6, 2010, Notice of Allowance.
U.S. Appl. No. 11/689,441, filed Jun. 16, 2010, Notice of Allowance.
U.S. Appl. No. 11/689,441, filed Sep. 9, 2010, Notice of Allowance.
U.S. Appl. No. 11/689,441, filed Dec. 10, 2010, Notice of Allowance.
U.S. Appl. No. 11/689,441, filed Mar. 29, 2011, Notice of Allowance.
U.S. Appl. No. 12/546,196, filed Nov. 5, 2009, Notice of Allowance.
U.S. Appl. No. 12/546,196, filed Feb. 26, 2010, Notice of Allowance.
U.S. Appl. No. 12/546,196, filed Jun. 24, 2010, Notice of Allowance.
U.S. Appl. No. 12/546,196, filed Sep. 27, 2010, Notice of Allowance.
U.S. Appl. No. 12/546,196, filed Dec. 6, 2010, Notice of Allowance.
Adaptive Lane Finding in Road Traffic Image Anlysis B.D. Stewart, I. Reading, M.S. Thomson, T.D. Ginnie, K W. Dickinson, C.L. Wan Napier University, Edinburgh, UK Road Traffic Monitoring and Control, Apr. 26-28, 1994 Conference Publication No. 391, IEEE, 1994 pp. 133-136.
IF Digital Generation of FMCW Waveforms for Wideband Channel Characterization, IEEE Proceedings-I, vol. 139, Jun. 1992 pp. 281-288.
SmartSensor Installation Guide WaveTronix Copyright 2004 pp. 1-26.
Autoscope Clearing the Congestion: Vision Makes Traffic Control Intelligent Brian Carlson Published in Advanced Imaging, Feb. 1997 5 pgs.
Econolite Control Products, Inc. Autoscope Automates 100% of Video Detection Set-Up: Introducing the Autoscope Wizard Nov. 1, 2003, 2 pages.
Autoscope Solo Pro II Machine Vision Processor Econolite Control Products, Inc. 2003, 2 pgs.
Sensor Technologies & Systems, Inc. AutoTrak Intelligent Transportation Systems/Advanced Traffic Management Systems Aug. 17, 2004 2 pgs.
J.D. Frederick et al., A Novel Single Card FMCW Radar Transceiver with On Board Monopulse Processing, Available at least as early as Mar. 1, 2002, 4 pgs.
Electronique Controle Mesure, LOREN Multi-Lane Microwave Detector, Available at least as early as Mar. 1, 2002, 2 pages.
MS Sedco, Motion Sensors, TC26-B Microprocessor-Controlled Vehicle Detector, Available at least as early as Mar. 1, 2002, 6 pages.
Accuwave LX-150 Microwave Detector, Available at least as early as Mar. 1, 2002, 3 pages.
Task Force L Final Reprot, Executive Summary, pp. 1-40, Available at least as early as Jan. 16, 2002.
On Bench Photographs of Detectors, pp. 1-9, Available at least as early as Jan. 16, 2002.
Transportation Operations Group—Sensors, pp. 1-13, Available at least as early as Jul. 21, 2001.
RTMS General Information, pp. 1-6, Available at least as early as Jul. 21, 2001.
RTMS Traffic Detector Primer, pp. 1-4, Available at least as early as Jul. 21, 2001.
RTMS User Manual, EIS Electronic Integrated Systems, Inc., Issue 3, Sep. 2000.
Stalker Lidar Operator Manual, Applied Concepts, Inc., Copyright 2000.
Sensys RS240 Radar Sensor, circa Oct. 2002.
Palen J (2001) A Watching Brief, Traffic Technology International Oct./Nov. p. 43-46.
Sakai et al., Optical Spatial filter Sensor for Ground Speed, Presented at the International Commission of Optics Topical Meeting, Kyoto, 1994, Optical Review, vol. 2, No. 1 (1995), 3 pages.
SpeedInfo, DVSS-1000 Installation Manual and Users Guide, Rev. 2.0, Feb. 18, 2004, 10 pages.
U.S. Department of Transportaion Federal Highway Administration, Field Test of Monitoring of Urban Vehicle Operations Using Non-Intrusive Technologies, Final Report, May 1997, 126 pages.
Detection Technology: For IVHS—vol. 1: Final Report Addendum, Publication No. FHWA-RD-96-100, Jul. 1995, 8 pages.
Texas Transportation Institute, Initial Evaluation of Selected Detectors to Replace Inductive Loops on Freeways, Report No. FHWA/TX-00/1439-7, Apr. 2000, 89 pages.
Yellin et al., An Algorithm for Dual-Chanel Noiseless Signal Reconstruction and its Performance Analysis, IEEE Transactions on Signal Processing, vol. 47, No. 6, Jun. 1999, 17 pages.
Canadian Driver, Automatic Collision Avoidance System Unveiled, Jun, 12, 2002, http://www.canadiandriver.com/news/020612.htm, 3 pages.
Rivenq-Menhaj et al., IOP Electronic Journals, Measurement Science and Technology, Combining Two Radar Techniques to Implement a Collision Avoidance System, www.iop.org/EJ/abstract109570233/9/8/030, from Meas. Sci Technol. 9 1343-1346, Aug. 1998, 2 pages.
Jansson et al., Decision Making for Collision Avoidance Systems, Copyright 2002, Society of Automotive Engineers Publication No. 2002-01-0403, 8 pages.
Gille, Velocity Probability Density Functions for Altimetry, Journal of Physical Oceanography, vol. 30, Jan. 2000, 12 pages.
Nuñez-Garcia et al., Random Sets and Histograms, Control Systems Center, UMIST, Fuzz-IEEE 2001:1183-1186, http://www.umist/ac.uk/csc 2001, 6 pages.
Waner et al., Calculus Applied to Probability and Statistics, Calculus and Probability, Sep. 2, 1996, http://people/hofstra.edu/faculty/Stefan_Waner/cprob/cprob2.html, 13 pages.
Berka et al., New Perspectives for ATMS: Advanced Technologies in Traffic Detection, Journal of Transportation Engineering, Jan./Feb. 1998, 7 pages.
Kim, et al., Two Novel Vehicle Detectors for the Replacement of a Conventional Detector, Microwave Journal (International ed.). Dedham: Jul. 2001 vol. 44, Iss. 7; http://proquest.umi.com/proxygw.wrlc.org/pqdlink?Ver. 7 pages.
Kramer, Envisioning a Radar-Based Automatic Road Transportation System, Intelligent Transportation Systems, May/Jun. 2001, 3 pages.
News Around the Industry, Spruce Meadows Partners, IMSA Journal, Nov./Dec. 2004, 4 pages.
Stellar Opportunities, How One Idaho Investment Firm Views the State's Business Future, Idaho Business IQ, Nov./Dec. 2003, 5 pages.
Howard, Venture Capitalists Break Cover, The Idaho Statesman, Stellar Tech Ends 4 Years of Keeping a Low Profile, Sep. 9, 2003; http://wvvw.idahostatesman.com/Business/story.asp?ID=48714, 2 pages.
Reijmers at al., The Influence of Vehicle Distribution Models on Packet Success Probability on a Three Lane Motorway, IEEE Publication No. 0-7803-4320-4/98, Copyright 1998 IEEE, 5 pages.
Gem et al., Advanced Lane Recognition—Fusing Vision and Radar, Proceedings of the IEEE Intelligent Vehicles Symposium 2000, Dearborn (MI) USA, Oct. 3-5 2000, 7 pages.
Gonzáalez, Lane Detection Using Histogram-Based Segmentation and Decision Trees, 2000 IEEE Intelligent Transportation Systems Conference Proceedings, Dearborn (MI) USA, Oct. 10, 2000, 6 pages.
Reijmers et al., Performance Analysis of Slotted Aloha on a Three Lane Motorway Using Measured Vehicle Positions, IEEE Publication No. 0-7803-3659-3/97, Copyright 1997 IEEE, 5 pages.
Ma et al., Road and Lane Edge Detection with Multisensor Fusion Methods, IEEE Publication No. 0-7803-5467-2/99 Copyright 1999.
Pilutti, et al., Identification of Driver State for Lane-Keeping Tasks IEEE Transaction on Systems, Man, and Cybernetics—Part A Systems and Humans, vol. 29, No. 5, Sep 1999, 17 pages.

Wilson et al., The Potential of Precision Maps in Intelligent Vehicles, Proceeding of IEEE Internaltion Conference on Intelligent Vehicles, IEEE Oct. 1998, 4 pages.

Able, A Radar Study of the Altitude of Nocturnal Passerine Migration, Bird-Banding, vol. 41, No. 4, Oct. 1970, 9 pages.

Manor, SPIDER: A Wireless Solution for Mid-block Detection, IMSA Journal, Mar./Apr. 2003, 6 pages.

Gresham, et al., Ultra Wide Band 24 GHz Automotive Radar Front-end, 2003 IEEE MTT-S Digest, 4 pages.

FCC Federal Communications Commission, Consumer & Government Affairs Bureau, Digital Radio—The Sound of the Future, http://www.fcc.gov/cgb/consumerfacts/digitalradlo.html, Reviewed/Updated on Sep. 24, 2003, 3 pages.

Klein, Sensor Technologies and Data Requirements for ITS, Artech House, Norwood, MA, Jun. 2001, 739 pages.

Federal Register, Jun. 1 2001, vol. 66, No. 106, Participation in the Intelligent Transportation Infrastructure Program, 2 pages.

Mobility Technologies, Mobility Technologies Offers Exclusive Data and Technology with New Traffic Pulse Partner Program, Press Release, May 31, 2001, 6 pages.

Yang, Bi-Mode Time-Space Multiplexing Antenna Array for Multi-Targets Detection in Automotive Application, IEEE Publication No. 0-7803-7070-8/01, Copyright 2001 IEEE, 4 pages.

Yung et al., Vehicle-Type Identification through Automated Virtual Loop Assignment and Block-Based Direction biased Motion Estimation, IEEE Publication No. 0-7893-4975-X/98, Copyright 1999 IEEE, 5 pages.

Schoepflin et al., Dynamic Camera Calibration of Roadside Traffic Management Cameras, The IEEE 5th International Conference on Intelligent Transportation Syatems, Sep. 3-6, 2002, Singapore, 6 pages.

Pumrin et al., Roadside Camera Motion Detection for Automated Speed Measurement, The IEEE 5th International Conference on Intelligent Transportation Systems, Sep. 30, 2002, Singapore, 5 pages.

Swangnate et al., A Conductor-Backed Coplanar Waveguide Direction Coupler for Varactor-Tuned Phase Shifting, Journal of KMITNB, vol. 12, No. 2, Apr.-Jun 2002, 5 pages.

Forman et al., A K-Band Ground-Backed CPW Balanced Coupler and Integrated Antenna Feed, European Microwave Conference, Oct. 2000, 4 pages.

Giles, Benefits of Auto-Configuring Traffic Sensing Equipment, Aug. 2004, 17 pages.

Kotzenmacher et al., Evaluation of Non-Intrusive Traffic Detection System, 2004 North American Travel Monitoring Exhibition & Conference (NATMEC), Jun. 27, 2004, 14 pages.

Detector User Needs from the Traffic Signals Workshop Held in Seattle, WA during Jul. 2003, circa Jul. 2003, 41 pages.

Vehicle Detector Workshop, TexITE, Jun. 2000, pp. 5-39.

R.L. Smith et al., "Development of a Low Cost, FM/CW Transmitter for Remote Sensing," IGARSS 2000 (Hawaii).

J.C. Beard et al., "6GHz Range Finder Using Pulse Compression," IGARSS 2000 (Hawaii).

J.L. Waite et al. "Interferometric Radar Principles in Track Hazard Detection to Improve Safety," IGASRSS 2000 (Hawaii).

D.A. Zaugg et al., "Ocean Surface and Landslide Probing with a Scanning Radar Altimeter," IGARSS 2000 (Hawaii).

B.T. Walkenhorst et al., "A Low cost, Radio Controlled Blimp as a Platform for Remote Sensing," 2000 (Hawaii).

Liu et al., "Radiation of Printed Antennas with a Coplanar Waveguide Feed," IEEE Transactions on Antennas and Propagation, vol. 43, No. 10, Oct. 1995, pp. 1143-1148.

T. Metzler, "Microstrip Series Arrays," IEEE Transactions on Antennas and Propagation, vol. AP-29, No. 1, Jan. 1981, pp. 174-178.

A.G. Derneryd, "Linearly Polarized Microstrip Antennas," IEEE Transactions of Antennas and Propagation, Nov. 1976, pp. 846-851.

Examination Report dated Mar. 29, 2007 from European Paten Appliation No. 04 701 207.5, 3 pages.

Smartek Systems, The SAS 1 Passive Acoustic Vehicle Detector Jan 14, 2002, 2 pages.

U.S. Appl. No. 09/966,146, mailed Sep. 10, 2002, Office Action.

U.S. Appl. No. 09/966,146, mailed Dec. 31, 2002, Notice of Allowance.

U.S. Appl. No. 09/964,668, mailed Nov. 6, 2002, Office Action.

U.S. Appl. No. 09/964,668, mailed Jun. 11, 2003, Office Action.

U.S. Appl. No. 09/964,668, mailed Oct. 1,2003, Notice of Allowance.

U.S. Appl. No. 10/744,686, mailed Mar. 9, 2005, Office Action.

U.S. Appl. No. 10/744,686, mailed Jun. 24, 2005, Office Action.

U.S. Appl. No. 10/744,686, mailed Dec. 2, 2005, Notice of Allowance.

U.S. Appl. No. 10/744,686, mailed Jan. 29, 2007, Office Action.

U.S. Appl. No. 10/744,686, mailed Aug. 9, 2007, Notice of Allowance.

U.S. Appl. No. 10/754,217, mailed Dec. 7, 2004, Office Action.

U.S. Appl. No. 10/754,217, mailed Apr. 22, 2005, Office Action.

U.S. Appl. No. 10/754,217, mailed Nov. 17, 2005, Office Action.

U.S. Appl. No. 10/754,217, mailed Feb. 24, 2006, Notice of Allowance.

U.S. Appl. No. 10/754,217, mailed Jun. 20, 2006, Office Action.

U.S. Appl. No. 10/754,217, mailed Jan. 11, 2007, Office Action.

U.S. Appl. No. 10/754,217, mailed Aug. 17, 2007, Notice of Allowance.

U.S. Appl. No.10/754,217, mailed Apr. 8, 2008, Notice of Allowance.

U.S. Appl. No. 11/264,339, mailed Apr. 6, 2009, Notice of Allowance.

U.S. Appl. No. 11/614,250, mailed Jul. 14, 2009, Office Action.

U.S. Appl. No. 11/614,250, mailed Nov. 4, 2009, Office Action.

U.S. Appl. No. 11/614,250, mailed Mar. 11,2010, Notice of Allowance.

U.S. Appl. No. 11/614,250, mailed Jun. 1, 2010, Notice of Allowance.

U.S. Appl. No. 11/614,250, mailed Oct. 20, 2010, Notice of Allowance.

U.S. Appl. No. 11/614,250, mailed Dec. 6, 2010, Notice of Allowance.

U.S. Appl. No. 12/546,219, mailed Mar. 11, 2010, Notice of Allowance.

U.S. Appl. No. 12/546,219, mailed Jun. 10, 2010, Notice of Allowance.

U.S. Appl. No. 12/546,219, mailed Oct. 22, 2010, Notice of Allowance.

U.S. Appl. No. 12/546,219, mailed Dec. 6, 2010, Notice of Allowance.

U.S. Appl. No. 12/546,196, mailed Nov. 5, 2009, Notice of Allowance.

U.S. Appl. No. 12/546,196, Jan 27, 2010, Notice of Allowance.

U.S. Appl. No. 12/546,196, Feb. 26, 2010, Notice of Allowance.

U.S. Appl. No. 12/546,196, Jun. 24, 2010, Notice of Allowance.

U.S. Appl. No. 12/546,196, Sep. 27, 2010, Notice of Allowance.

U.S. Appl. No. 12/546,196, Dec. 6, 2010, Notice of Allowance.

DETECTING TARGETS IN ROADWAY
INTERSECTIONS

CROSS-REFERENCE TO RELATED APPLICATIONS

This application claims the benefit of U.S. Provisional Application No. 61/185,005, entitled "Detecting Targets in Roadway Intersections and Tracking Targets Across Beams", filed on Jun. 8, 2009, which is incorporated herein in its entirety. This application is a continuation-in-part of U.S. patent application Ser. No. 11/614,250, entitled "Detecting Targets in Roadway Intersections", filed Dec. 21, 2006 now U.S. Pat. No. 7,889,097, which is incorporated herein in its entirety. This application is a continuation-in-part of U.S. patent application Ser. No. 11/264,339, entitled "Systems and Methods for Configuring Intersection Detection Zones", filed Oct. 31, 2005 now U.S. Pat. No. 7,573,400, which is incorporated herein in its entirety.

BACKGROUND

1. Background and Relevant Art

The use of traffic sensors for the actuation of traffic signal lights located at roadway intersections is quite common. Generally, such traffic sensors can provide input used to properly actuate traffic control devices in response to the detection or lack of detection of vehicles. For example, traffic sensors can enable a traffic control device to skip unnecessary signal phases, such as, for example, skipping a left hand turn phase when no vehicles are detected in a corresponding left hand turn lane.

Traffic sensors can also enable a traffic signal to increase green light duration for major arterials by only signaling the green light in the minor cross streets when vehicles are detected on the minor cross streets and thus minimizing the red light for a major arterial. Thus, traffic sensors assist in properly actuating a signalized intersection to improve traffic flow. In addition to the actuation of signalized intersections of roadways for automobile traffic, traffic sensors are also used for the actuation of intersections of a roadway for automobile traffic with a railway.

Unfortunately, the cost of traffic sensors, the cost of corresponding installation, and the subsequent maintenances costs can be relatively high. Thus, traffic sensors and related costs can become a significant expenditure for municipalities. The high installation costs arise at least in part from the need to shut down lanes of traffic and cut into the roadway surface. High maintenance costs arise from the need to repair and reconfigure sensors that do not consistently perform well.

Typically, traffic signal lights have been actuated using inductive loop detectors embedded in the roadway. Inductive loop detectors are very expensive to install since lane closures are necessary. The high cost is compounded, especially for multi-lane roadways, since at least one inductive loop detector is required for each detection zone (e.g., left hand turn lane detection zones, through lane detection zones, and right hand turn lane detection zones). Furthermore, inductive loop detector technology is often unreliable and inductive loop detectors require a great deal of calibration.

Similar to inductive loop detectors, magnetometer detectors are embedded in the roadway surface and require lane closures to install. Furthermore, these detectors are dependent on batteries for operation, bringing into question the usable life of the sensor. Additionally, the sensors must be replaced or reinstalled when the roadway is resurfaced.

Video detectors are also used in some traffic signal actuation systems. To facilitate traffic signal light actuation, a video camera is placed high above a signal arm such that the video camera's view covers one approach to the intersection. The video signal from the camera is digitally processed to create detections in the defined zones. Using video detectors an intersection can be monitored on a per approach basis (that is all the lanes of an approach), as opposed to the per detection zone basis used with inductive loops. Since a dedicated mounting arm is often necessary the installation of a video detector system can also be expensive and time consuming. Furthermore, video detectors require a great deal of maintenance since the video cameras often fail and they require cleaning. The performance of video detection is affected by visibility conditions such as snow, rain, fog, direct light on the camera at dusk and dawn, and the lighting of the roadway at night.

Microwave detectors have also been used in intersections to provide detection coverage over limited areas. At least one microwave detector has a limited degree of mechanical and electrical steering. Further, the coverage is typically over a small portion of the intersection.

Other microwave sensors have included multiple receive antennas but have included only a single transmit antenna that has a very broad main beam or even may be an omni-directional antenna. Systems that employ only one broad beam or omni-directional transmit antenna typically cannot achieve an appropriately reduced side lobe power level. Furthermore, these single transmit antenna systems typically suffer from widening of the main lobe.

At least one microwave detector, which has been used for mid-block traffic detection applications near intersections, has two directional receive antennas and one directional transmit antenna. The multiple antennas create parallel radar beams that can be used to make velocity measurements as vehicles pass through the beams. However, the antennas of this device cannot cover enough of the intersection to provide coverage over a large area.

Acoustic sensors have also been used in intersections to cover limited detection zones. However, these sensors only monitor a limited area on an intersection approach and are subject to detection errors arising from ambient noise.

BRIEF SUMMARY

The present invention extends to methods, systems, and computer program products for detecting targets in roadway intersections. Embodiments of the invention include a traffic sensor for monitoring a roadway intersection. The traffic sensor includes an antenna array of transmit antennas and receive antennas. The transmit antennas are for transmitting radio frequency (RF) signals into the roadway intersection. The receive antennas are for receiving reflections of the radio frequency (RF) signals reflected off of objects in the roadway intersection. The reflections corresponding to two dimensional image data for the roadway intersection.

The traffic sensor also includes a radio frequency (RF) signal generator for generating radio frequency (RF) signals. The traffic sensor also includes a receive channel. The receive channel is for conditioning received reflections of the radio frequency (RF) signal for compatibility with a processor. The traffic sensor also includes circuitry providing a transmission path from the radio frequency (RF) signal generator to the antenna array and providing a transmission path from the antenna array to the receive channel. The transmissions paths are provided simultaneously.

The traffic sensor includes a processor. The processor is for processing conditioned reflections corresponding to two dimensional image data for the roadway intersection into a two dimensional image of targets in the roadway intersection.

Other embodiments include methods for detecting targets in roadway intersections.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products detecting targets in roadway intersections. Embodiments of the invention include a traffic sensor for monitoring a roadway intersection. The traffic sensor includes an antenna array of transmit antennas and receive antennas. The transmit antennas are for transmitting radio frequency (RF) signals into the roadway intersection. The receive antennas are for receiving reflections of the radio frequency (RF) signals reflected off of objects in the roadway intersection. The reflections corresponding to two dimensional image data for the roadway intersection.

The traffic sensor also includes a radio frequency (RF) signal generator for generating radio frequency (RF) signals. The traffic sensor also includes a receive channel. The receive channel is for conditioning received reflections of the radio frequency (RF) signal for compatibility with a processor. The traffic sensor also includes circuitry providing a transmission path from the radio frequency (RF) signal generator to the antenna array and providing a transmission path from the antenna array to the receive channel. The transmissions paths are provided simultaneously.

The traffic sensor includes a processor. The processor is for processing conditioned reflections corresponding to two dimensional image data for the roadway intersection into a two dimensional image of targets in the roadway intersection.

Other embodiments include methods for detecting targets in roadway intersections.

Embodiments of the invention include intersection traffic detection products that; can be mounted above the roadway surface, monitor a wide portion of the roadway, and are robust to varying lighting and weather conditions.

In this specification and in the following claims, the term "roadway intersection" is defined as the intersection of two or more roadways for automobile and/or truck traffic including the approaches to the intersection and also includes an intersection of roadways with one or more thoroughfares for other traffic, including the approaches to the intersection. Thoroughfares for other traffic may include pedestrian paths and railways.

Figure 1:
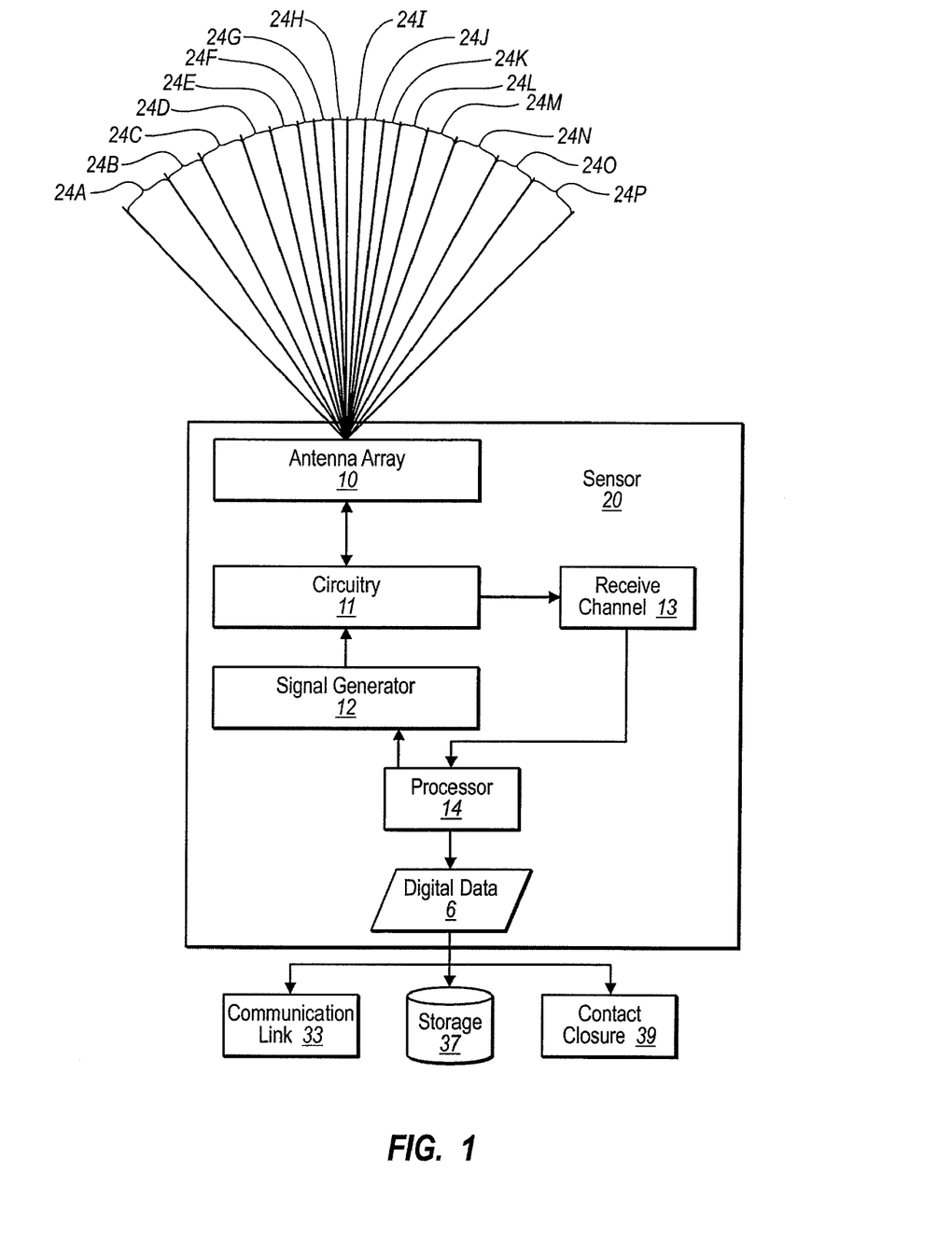
FIG. 1 illustrates an embodiment of a traffic sensor.

FIG. 1 is an example traffic sensor 20. Generally, traffic sensor 20 can be used to detect objects (e.g., vehicles, pedestrians, etc.) at a roadway intersection. As depicted, traffic sensor 20 includes antenna array 10, circuitry 11, Signal generator 12, receive channel 13, and processor 14.

Generally, antenna array 10 is configured to create antenna beams over which a transmit signal is propagated and/or from which received signals are received. In some embodiments, antenna array 10 creates multiple antenna beams that are steered so that the antennas overlap at their 3 dB points creating continuous coverage over a 90 degree area.

Antenna array 10 can include a plurality (and potentially a large number) of transmit antennas and can include a plurality (and potentially a large number) of receive antennas. Transmit antennas can be configured to transmit signals into a roadway intersection. Transmit antennas can be directional antennas used to transmit a signal. Receive antennas can be configured to receive reflections of signals reflected off of objects in the roadway intersection. The reflections can correspond to two dimensional image data for the roadway intersection. Receive antennas can also be directional antennas used to receive (e.g., reflected) signals.

Using directional antennas (potentially for both transmit antennas and receive antennas) has at least two advantages over the use of other types of antennas, including broad beam antennas. One advantage is that the sidelobe level in the two way antenna pattern is reduced. Another advantage is that the width of the mainlobe of the in the two way antenna pattern is also reduced.

Generally, the number of transmit and receive antennas used in an antenna area can be matched to the size of the area that is to be covered. For larger areas the number of transmit and receive antennas can be increased. In some embodiments, the number of transmit and receive antennas is selected to provide sufficient angular resolution or sufficient coverage.

Signal generator 12 is configured to generate a radar signal. Generally, circuitry 11 is configured to provide a transmitting transmission path between signal generator 12 and antenna array 10. Signals generated at signal generator 12 can pass from signal generator 12, along the transmitting transmission path, to antenna array 10 for transmission. The transmitting transmission path can include appropriate switches that switch the transmission path to each (e.g., transmitting) antenna in the antenna array 10 in sequence Circuitry 11 is also configured to provide a receiving transmission path between antenna array 10 and receive channel 13. Reflected signals received at antenna array 10 can pass from antenna array 10, along the receive transmission path, to receive channel 13. The receive transmission path can include a mixer that mixes down received reflected signals to baseband.

Receive channel 13 is configured to condition received reflections for compatibility with processor 14. When appropriate, receive channel 13 provides one or more of: multiplexing, filtering, and amplification before providing received signals for analog to digital conversion. In some embodiments, baseband signal lines are multiplexed to a single signal line.

Processor 14 processes signals corresponding to received reflections to convert the signals into meaningful digital data (e.g., digital data 6). In some embodiments, the processing algorithms combine the data from the plurality of antennas into one complete (e.g., two dimensional) image before detecting vehicles. Processor 14 can be a digital signal processor configured to convert received signals into digital data and deliver digital data to external components, such as, for example, communication link 33 (e.g., to a display device or another computer system), storage 37, and contact closure 39. Storage 37 can be a computer-readable storage media, such as, for example, a magnetic disk, an optical disk, a flash drive, RAM, etc.)

Digital data 6 can include, for example, a sensor configuration, presence indications, vehicle detections, estimated vehicle speed, and traffic statistics. Traffic statistics can include: vehicle counts per lane; vehicle counts per direction; vehicle counts per approach; turning counts; average speeds per lane, direction, or approach; 85th percentile speeds per lane, direction, or approach; occupancy per lane, direction, or approach; etc.

Processor 14 can also be configured to control signal generator 12. For example, processor 14 can send a signal activation command to signal generator 12 when signal generator 12 is to generate a signal.

Sensor 20 can also include system memory (e.g., RAM). Processor 14 can utilize the system memory when processing digital data 6.

In some embodiments, signal generator 12 is a radio frequency ("RF") generator that generates RF signals. For example, signal generator 12 can generate a frequency modulated continuous wave ("FMCW") RF signal. The FMCW RF signal can be generated via direct digital synthesis and frequency multiplication. In these embodiments, circuitry 11 includes RF circuitry having RF switches. The RF switches are used to switch the transmission path for an RF signal to each (e.g., transmitting) antenna in the antenna array 10 in sequence.

In these embodiments, the RF circuitry is also configured to provide a receiving transmission path for received reflected RF signals. Receive channel 13 can condition received reflected RF signals for compatibility with processor 14. When appropriate, receive channel 13 provides one or more of: multiplexing, filtering, and amplification before providing received reflected RF signals for analog to digital conversion.

Also in these embodiments, the same antenna can used to both transmit an RF signal and receive reflected RF signals. Accordingly, the number of antennas in the antenna array can be reduced by half relative to embodiments in which separate transmit and receive antennas are required. Transmit antennas can be directional antennas used to transmit an RF signal. Similarly, receive antennas can be directional antennas used to receive reflected RF signals.

Accordingly, in some embodiments, the range to the targets in each of the antenna beams is determined through the use of an FMCW RF signal. The angle to targets in a roadway intersection can be determined through the use of the individual antennas in the antenna array. As a result, the range and angle can be determined for targets in a large portion of a roadway intersection. From this information a two dimensional image of the roadway intersection can be constructed.

Figure 2:
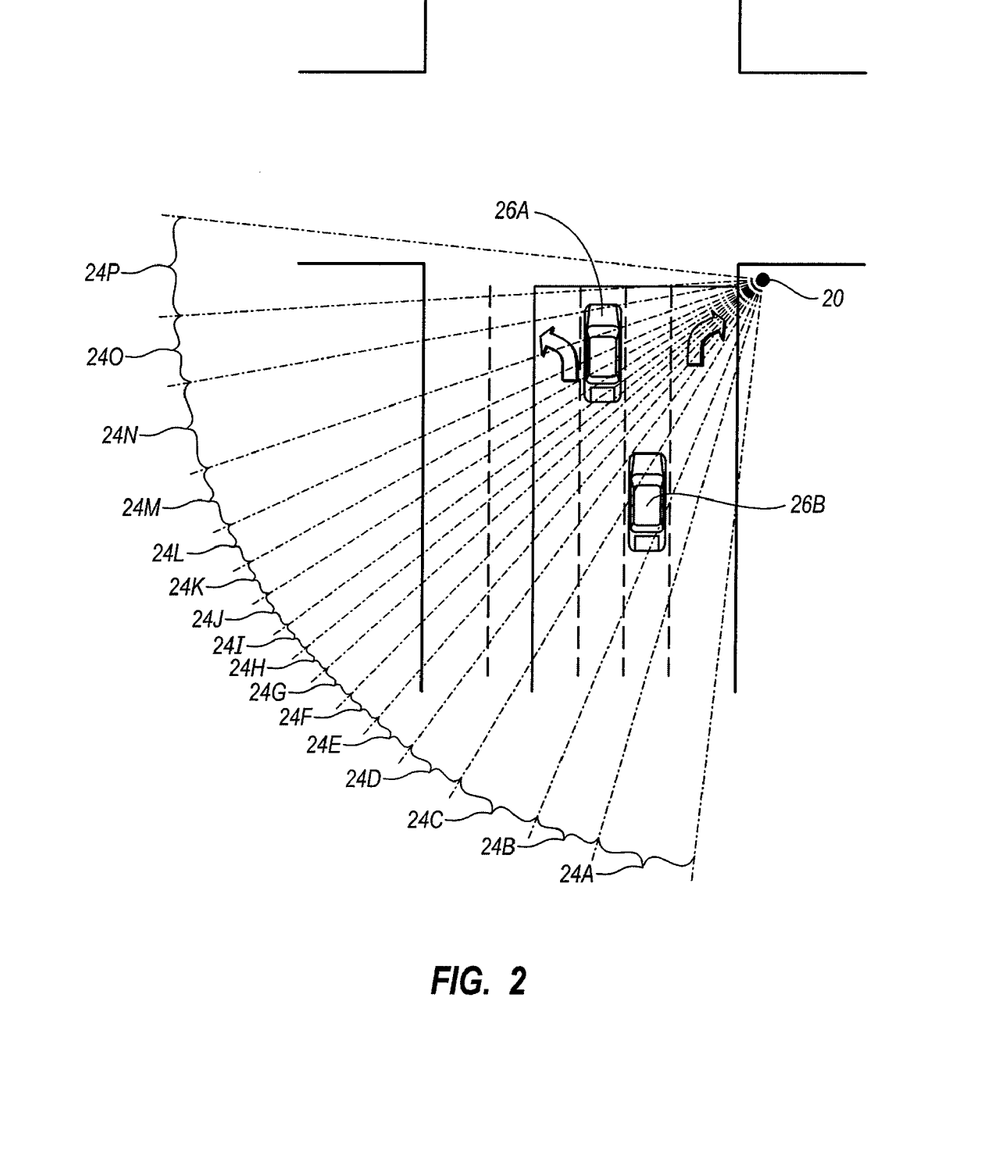
FIG. 2 depicts the traffic sensor of FIG. 1 in a roadways intersection and depicts a further aggregate sensor view.

FIG. 2 depicts the intersection traffic sensor 20 of FIG. 1 in a roadway intersection 41. Sensor 20 utilizes multiple antenna beams 24A-24P. Circuitry 11 can be configured to switch radar signal transmission between antenna beams 24A-24P on and off in sequence. Switching circuitry can control when each antenna beam is transmitting. A baseband multiplexer can control when a received (e.g., reflected) signal is processed for an antenna.

Processor 14 can measure the range to targets in each of the antenna beams 24A-24P. The range is the distance between sensor 20 and the targets 26A and 26B. Further, by using each of the antenna beams 24A-24P, sensor 20 can receive a radar return (e.g., a reflection off of vehicle 26A or 26B) from multiple azimuth angles. The multiple azimuth angles are measured in the horizontal plane, and can measure the range to the targets at each of the azimuth angles. In this way, processor 14 can create a two dimensional image of the targets (e.g., 26A and 26B) in and/or approaching intersection 41. Processor 14 can create an image using a two dimensional orthogonal coordinate system, such as, for example, a Cartesian coordinate system, a polar coordinate system, etc.

Figure 3:
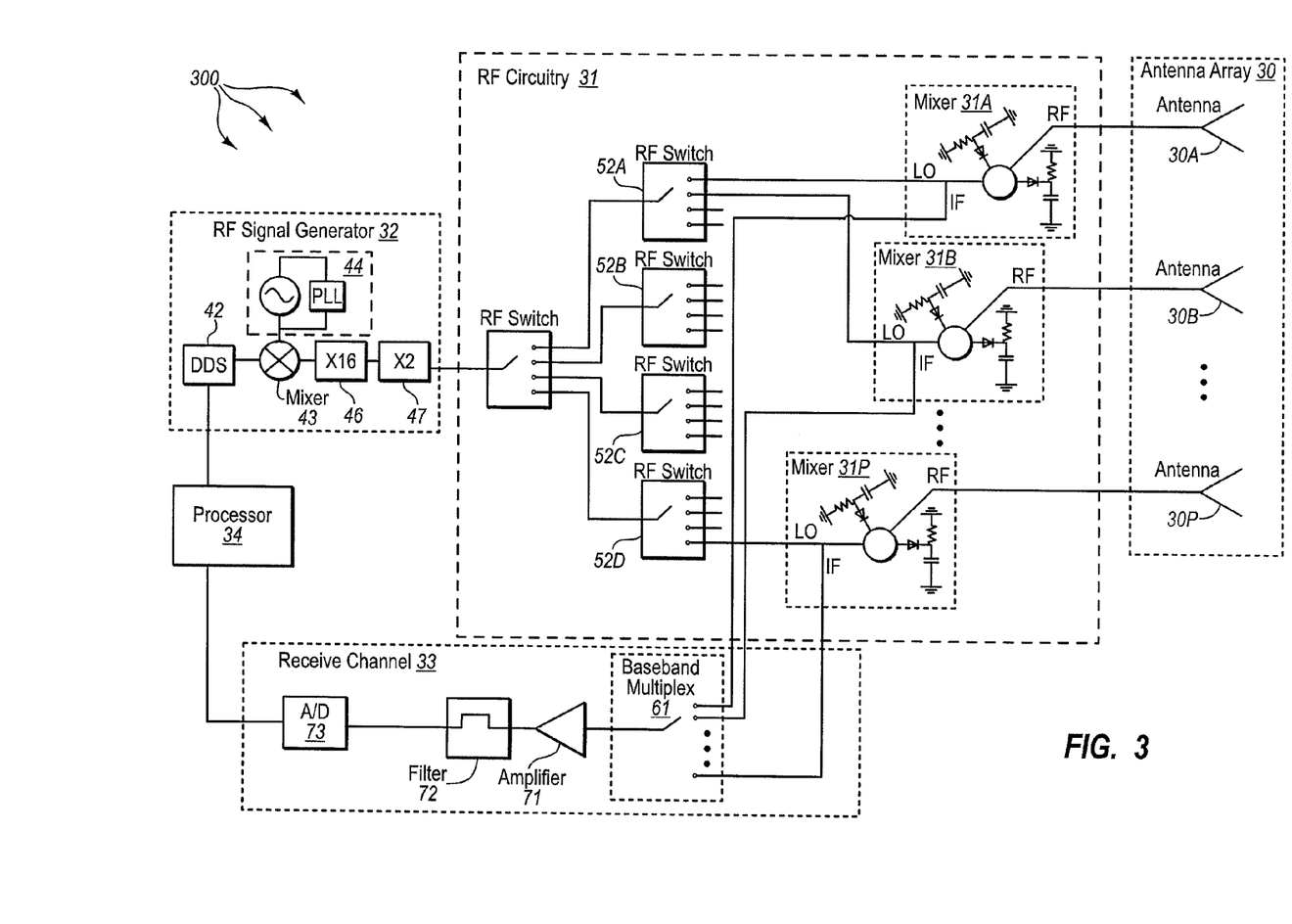
FIG. 3 depicts an example architecture for an intersection traffic sensor.

FIG. 3 depicts architecture 300 for an intersection traffic sensor, such as, for example, sensor 20. As depicted, architecture 300 includes RF signal generator 32, processor 34, receive channel 33, RF circuitry 31, and antenna array 30.

Processor 34 is electrically connected to RF signal generator 32 and receive channel 33. Processor 34 controls the time of signal generation, which occurs in RF signal generator 32. RF signal generator 32 can include various components for generating an RF signal. For example, as depicted, RF signal generator 32 including direct digital synthesizer ("DDS") 42, mixer 43, phase locked voltage controlled oscillator 44. Phase locked voltage controlled oscillator 44 is for frequency up conversion. As depicted, RF signal generator 32 also includes times 16 multiplier 46 and times two multiplier 47. Filtering is performed at the output of DDS 42, after the up conversion, and after each multiplication stage. The resulting modulated signal includes frequencies between 24 GHz and 24.25 GHz.

As depicted, RF signal generator 32 is electrically coupled to RF circuitry 31. As such, generated RF signals travel from RF signal generator 32 to RF circuitry 31. RF circuitry 31 includes two stages of RF switches. One stage includes RF switch 51 and another stage includes RF switches 52A, 52B, 52C, and 52D. Accordingly, RF signals can pass through these two states of RF switches.

The switches 51 and 52A-52D provide a transmission path for an RF signal to one of 16 mixers, 31A through 31P. Each mixer includes a local oscillator ("LO") port and an RF port. The mixers are designed such that a transmission path exists between the LO port and the RF port (i.e., the LO port and the RF port are not electrically isolated). The transmission path between LO port and RF port allows RF signals to pass through the mixer to the corresponding antenna 30A through 30P.

Mixers 31A through 31P are electrically connected to baseband multiplexer 61. Received (e.g., reflected) signals, for example, corresponding to two dimensional image data for a roadway intersection, enter a mixer via its RF port from the corresponding antenna 30A through 30P. Received (e.g., reflected) signals are mixed with the RF signal into a baseband signal. The baseband signal leaves the mixer via the intermediate frequency ("IF") port and is received at baseband multiplexer 61. Thus, baseband multiplexer 61 can multiplex the baseband signal from the IF ports onto a single signal path.

Baseband multiplexing can be synchronized with the RF switching. Accordingly, the mixer having the transmission path selected by the RF switches 51 and 52A-52D (i.e., to which the transmit transmission path is selected) is also the mixer to which baseband multiple 61 is switched. For example, if RF switch 51 is in the top position and RF switch 52A is in the second position, the transmit transmission path is switched to mixer 31B. Thus, when the RF switches are in these positions, baseband multiplexer 61 can also be switched to receive a baseband signal from the IF port of mixer 31B.

In some embodiments, the mixers 31A through 31P are ring mixers. Each ring mixer can include two diodes, with a corresponding capacitor and resistor for biasing, which are positioned around a circular transmission line.

Further components in receive channel 33 can convert the baseband signals into digital data interpretable by processor 34. In some embodiments, receive channel 33 includes amplifier 71, a filter 72, and an analog to digital ("A/D") converter 73. After a baseband signal is digitized, the digital data then passes to processor 34 where it is converted into useful information. For example, from the digital data, processor 34 can generate a two dimensional image of targets in a roadway intersection.

The components depicted in FIG. 3 can be manufactured onto a printed circuit board using printed circuit board techniques.

In some embodiments, the same the same directional antenna is used to transmit and receive. Using the same directional antenna decreases the sidelobe level in the two-way antenna patterns and narrows the main bean in the two-way antenna patterns. For example, a directional antenna can have a mainlobe steered to a specific direction and will have sidelobes in other directions. In some antennas, these sidelobes receive or transmit power at an approximate level of approximately −20 dB from the mainlobe.

When the same antenna is used to transmit and receive, then the combined sidelobe approximate level is −40 dB. Furthermore, the same effect that causes the reduced sidelobe level in the two-way antenna pattern also causes a narrowing of the mainlobe. Thus, when the same directional antenna is used, the beam width of the mainlobe is narrower and the sidelobe level is lower than if a single broad transmit antenna is used.

In some embodiments, the antennas in an antenna array are traveling wave series fed microstrip patch antennas that are terminated by a matched microstrip patch. Traveling wave series fed microstrip patch antennas create a fan shaped antenna beam. This type of antenna is a printed microwave antenna that is manufactured onto a printed circuit board using printed circuit board techniques. The antennas can be oriented so that the antenna beam is narrow in the azimuth (or horizontal) plane and wide in the elevation (or vertical) plane. The steer angle of the beam, which is measured in the azimuth plane, may be dictated by the phasing between the antenna elements. The spacing of the elements at least in part controls this phasing. For example, antennas is can be configured so that their beams are steered to near boresight (perpendicular).

In some embodiments, the components depicted in FIG. 3 are printed onto one circuit board and a series of wave series fed microstrip patch antennas are printed onto another circuit board. The two circuit boards are electrically connected to one another.

Figure 4:
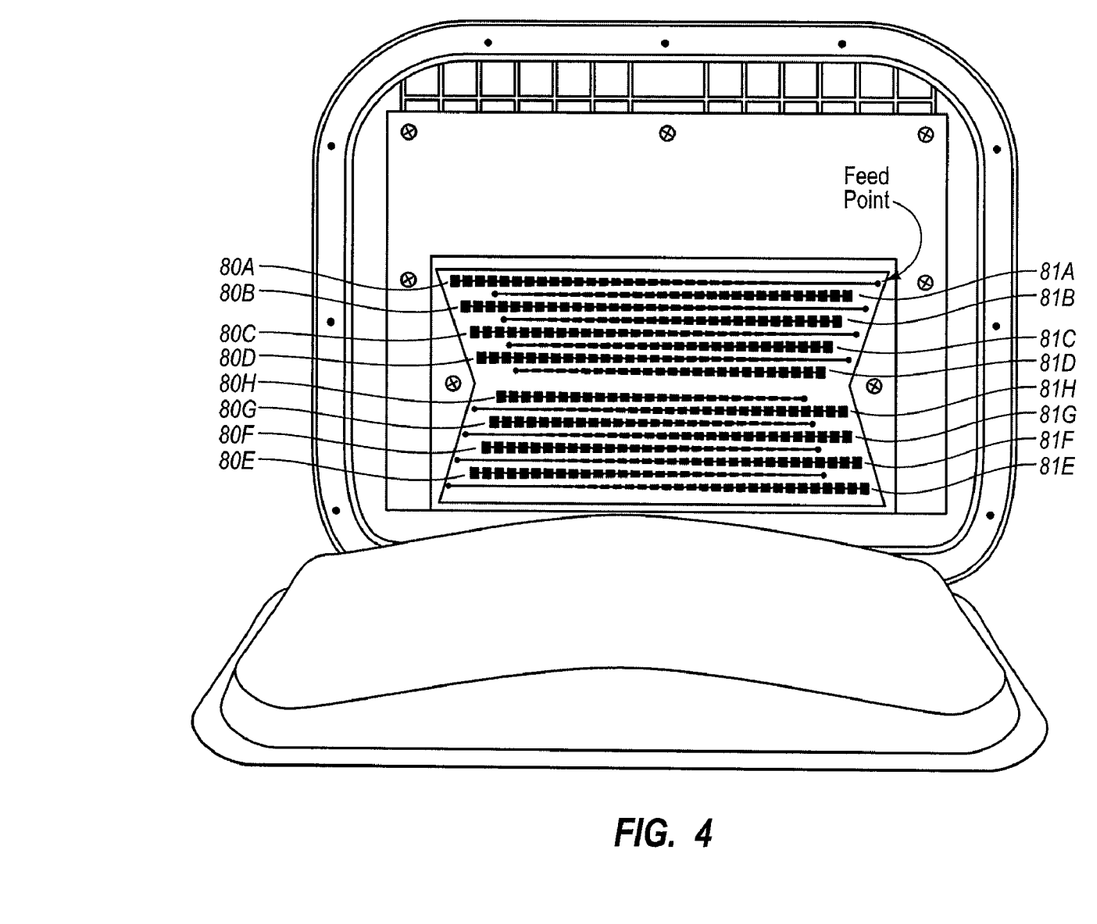
FIG. 4 illustrates an example of an antenna array.

FIG. 4 illustrates an example of an antenna array. As depicted in FIG. 4, antennas 80A through 80E are all fed from the right and are phased so that the beams are also steered to the observer's right. Antennas 81A through 81E are flipped so that their feed points are on the left, the steer angles of these antennas is also flipped so that the antennas are steered to the observer's left. The eight antennas with feed points on the right (80A through 80E) are designed with different steer angles so that beams cover the area between boresite and 45 degrees to the right. The eight antennas with feed points on the right (81A through 81E) with different steer angles so that beams cover the area between boresite and 45 degrees to the left.

Figure 5:
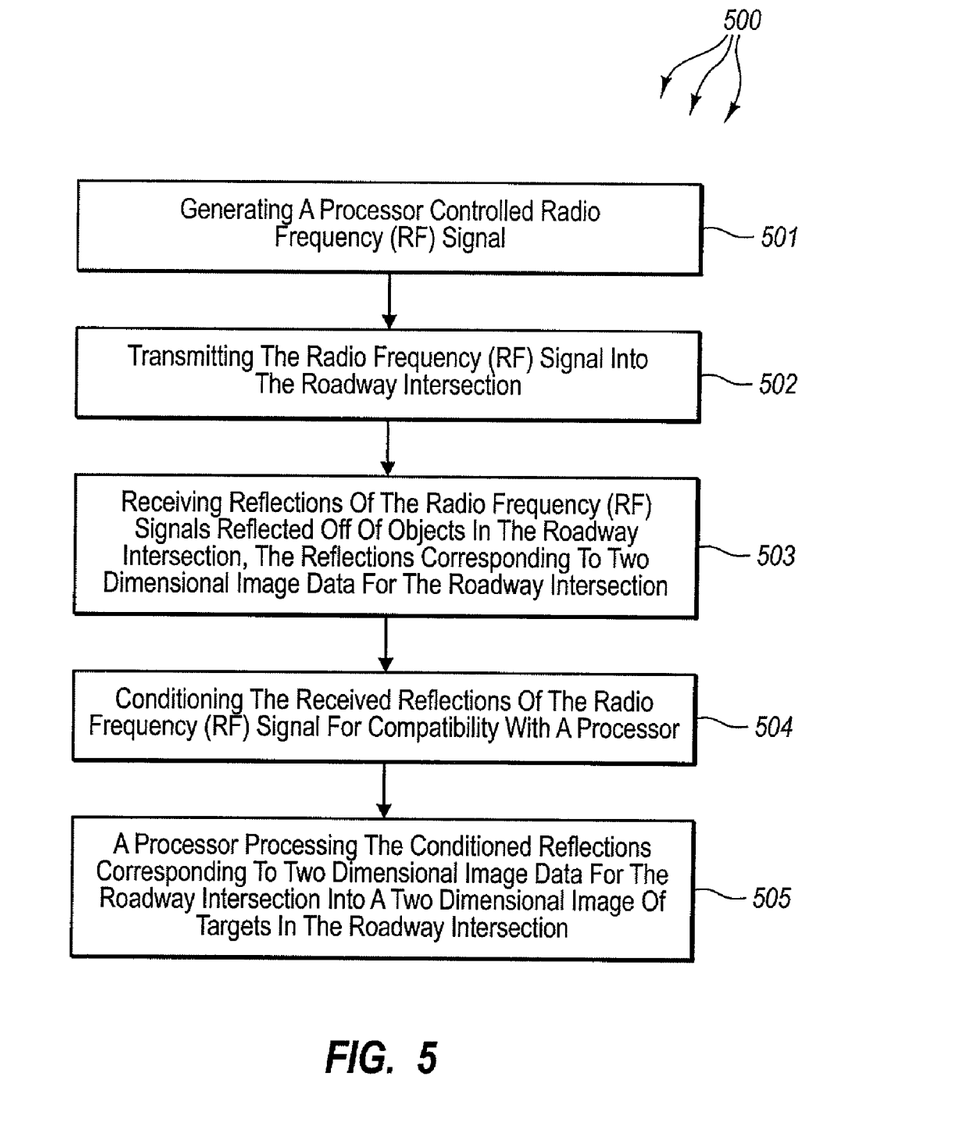
FIG. 5 illustrates an example flow chart of a method for detecting targets in a roadway intersection.

FIG. 5 illustrates an example flow chart of a method 500 for detecting targets in a roadway intersection. The method 500 will be described primarily with respect to the components in FIG. 3 and with some reference to FIG. 2.

Method 500 includes an act of generating a processor controlled radio frequency (RF) signal (act 501). For example, RF signal generator 32, as controlled by processor 34, can generate an RF signal. RF switches 51 and 52A-52D can set the transmit transmission path to a specified mixer. The generated RF signal can then pass through the RF switches to the specified mixer. The RF signal can then pass out the RF port the specified mixer to the corresponding antenna. For example, from mixer 31B to antenna 30B.

Method 500 includes an act of transmitting the radio frequency (RF) signal into the roadway intersection (act 502). For example, antenna 30B can transmit the RF signal into a roadway intersection (e.g., similar to intersection 41). Method 500 includes an act of receiving reflections of the radio frequency (RF) signals reflected off of objects in the roadway intersection, the reflections corresponding to two dimensional image data for the roadway intersection (act 503). For example, antenna 30B can receive reflections of the transmitted RF signal. The reflections can correspond to objects (e.g., cars 26A and 26B). The received reflections can correspond to two dimensional image data for intersection 41.

Method 500 includes an act of conditioning the received reflections of the radio frequency (RF) signal for compatibility with a processor (act 504). For example, mixer 31B can mix the received reflections into a baseband signal. The baseband signal can pass out the IF port of mixer 31B to baseband multiplexer 61. Baseband multiplexer 61 can output the baseband signal for further conditioning at other components in receive channel 33. For example, the components of receive channel 33 can convert the baseband signal into digital data compatible with processor 34.

Method 500 includes an act of a processor processing the conditioned reflections corresponding to two dimensional image data for the roadway intersection into a two dimensional image of targets in the roadway intersection (act 505). For example, processor 34 can process condition reflections corresponding to two dimensional data for intersection 41 in a two dimensional image that includes vehicles 26A and 26B in intersection 41

Generally, embodiments of the invention can be used to assist in the control of traffic control devices, such as, for example, traffic control lights. For example, at intersections where one or more approaches include a significantly reduced volume of traffic compared to other approaches of the intersection, embodiments of the invention can be used to activate a green signal to the low volume approach in response to detecting on coming vehicles. Similar detections and activations can be used for turn lanes when vehicles are present. Further, embodiments of the invention can be used to hold a green light when transition to yellow and then to red would potentially cause one or more vehicles to enter a dilemma situation (e.g., causing uncertainty about whether to stop or continue through an intersection)

Figure 6A:
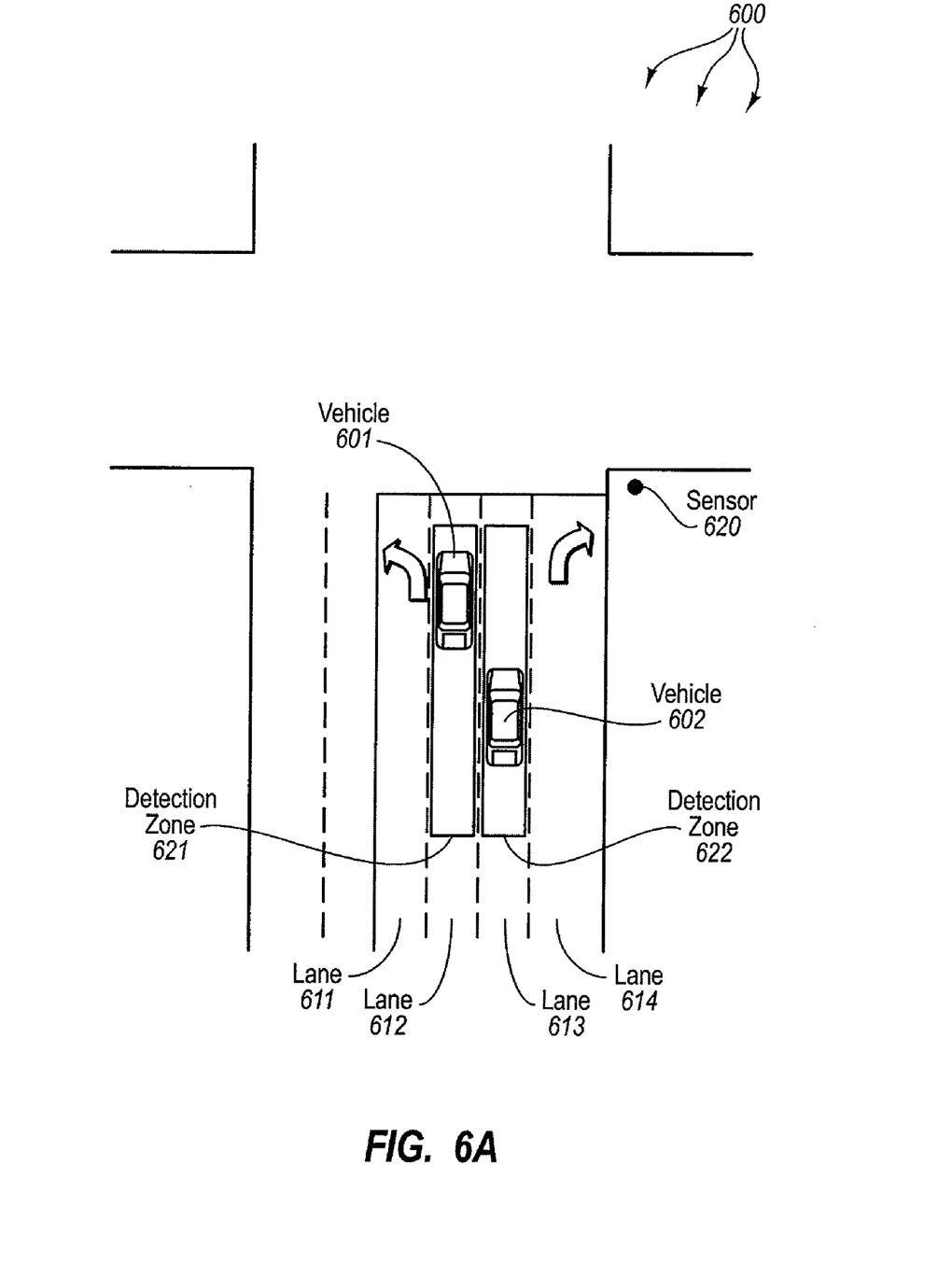
FIGS. 6A through 6C illustrate examples of two dimensional detection zones.

Use of a two dimensional coordinate system also facilitates the creation and use of more complex combinations of detection zones. That is, detection zones are not necessarily limited to the area between a pair of parallel lines perpendicular to an intersection approach. FIG. 6A depicts an example of detection zones that can be used to distinguish between targets in different lanes. As depicted, an approach to intersection 600 includes lanes 611, 612, 613, and 614. Zone 621 is configured as a rectangle within lane 612 and zone 622 is configured as a rectangle within lane 613. Accordingly, when sensor 620 detects a target in detection zone 621, sensor 620 determines that the target is in lane 612. Similarly, when sensor 620 detects a target in detection zone 622, sensor 620 determines that the target is in lane 613.

Figure 6B:
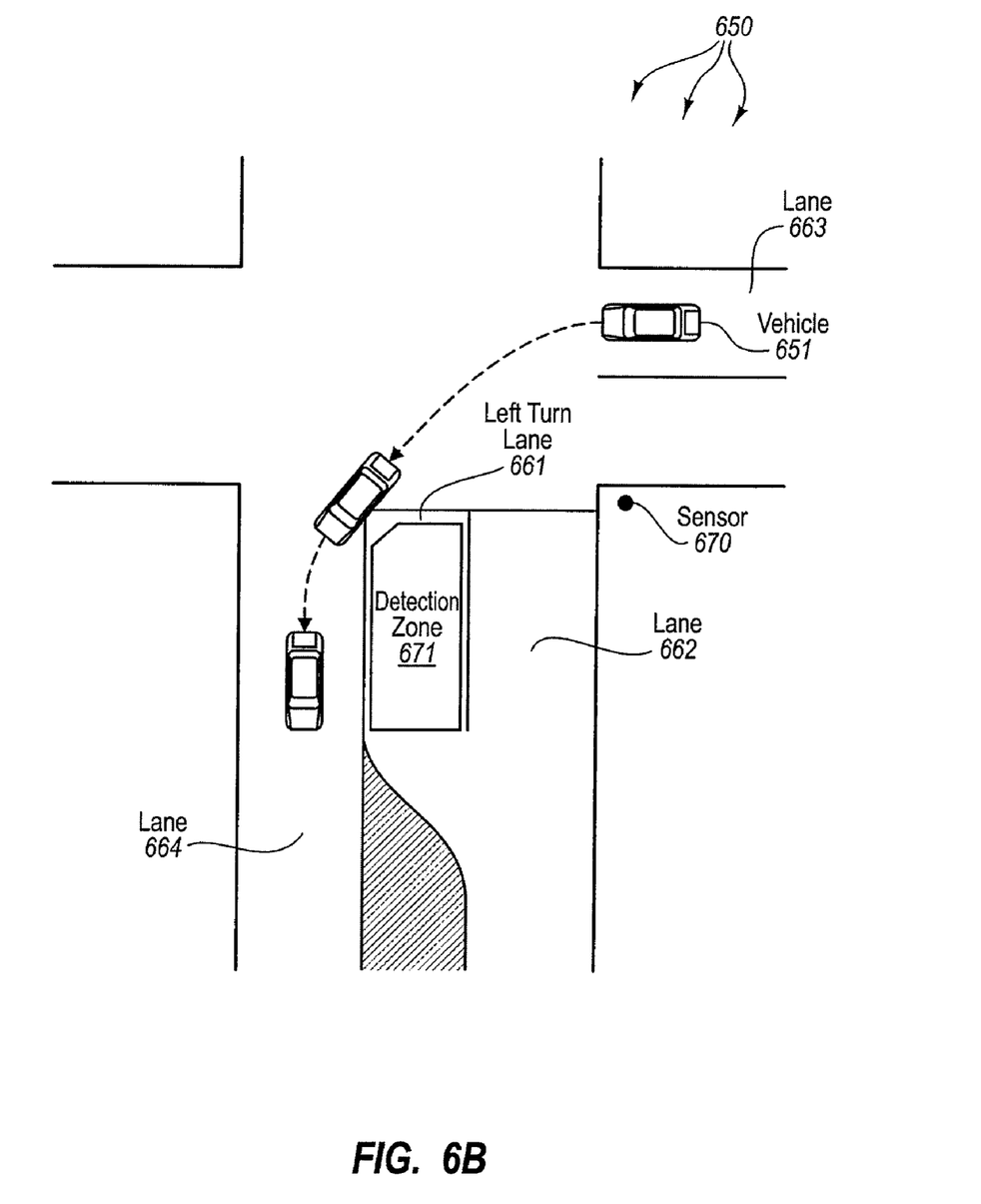

FIG. 6B depicts an example of a detection zone that can be used to more accurately detect targets in a turn lane. As depicted, one approach to intersection 650 includes left turn lane 661 and lane 662 and another approach includes lane 663. Detection zone 671 is configured for detecting targets in turn lane 661. Accordingly, when sensor 670 detects a target in detection zone 671, sensor 650 determines that the target is in left turn lane 661. From time to time, vehicles turning left from lane 663 to lane 664 may partially enter the corner of left turn lane 661 (e.g., as depicted by the path of vehicle 651). However, the configuration of detection zone 671 is such that vehicles turning left from lane 663 to lane 664 are less likely to improperly cause a detection in left turn lane 661 when following such a path. For example, with the configuration of detection zone 671, vehicle 651 has a reduced chance of entering detection zone 671 and thus causing an improper detection when traveling the depicted path.

Figure 6C:
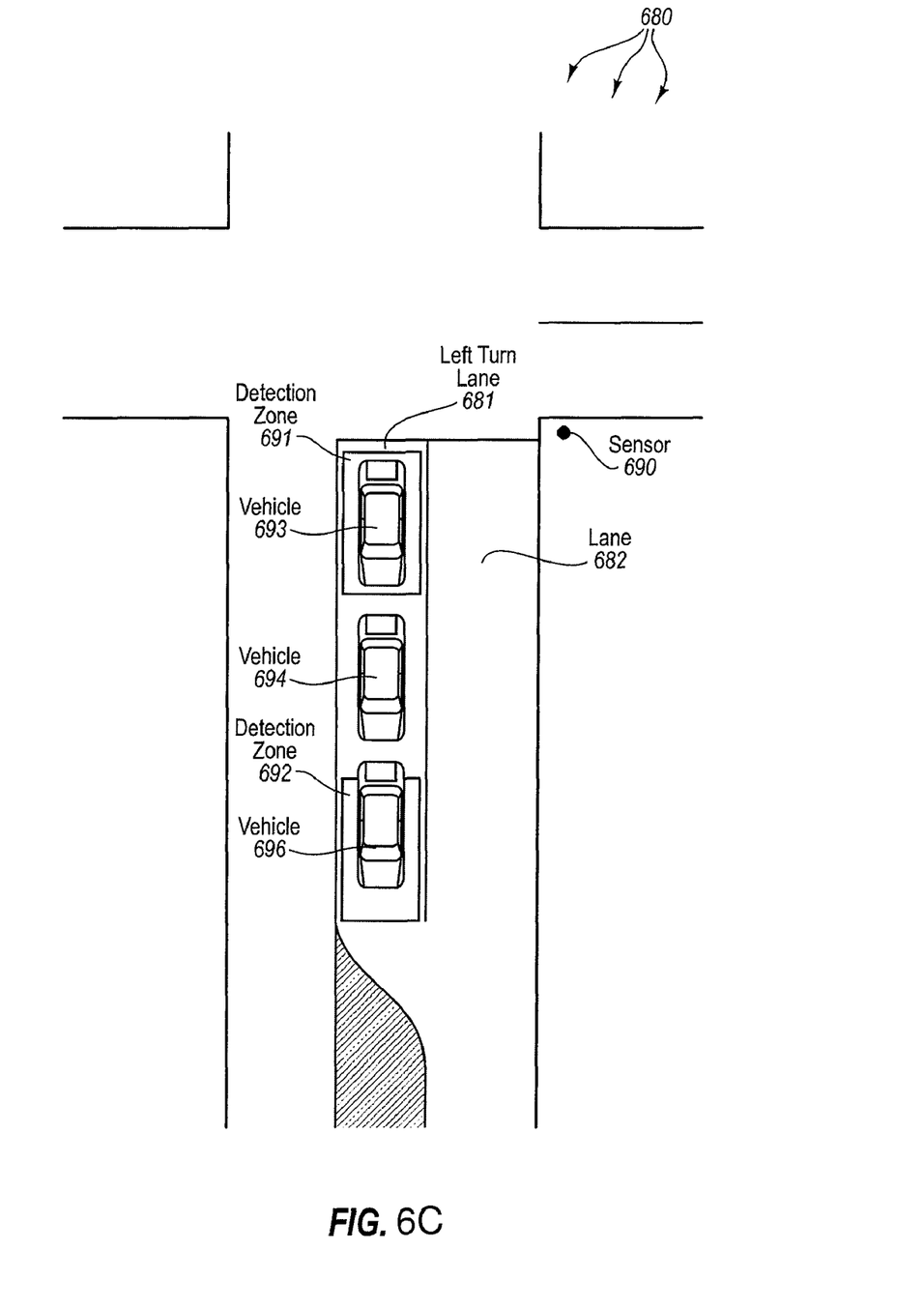

FIG. 6C depicts an example of detection zones that can be used to more appropriately determine when a turn signal is to be activated. As depicted, one approach to intersection 680 includes left turn lane 681 and lane 682. Left turn lane 681 includes detection zone 691 closer to the stop bar for left turn lane 681 and detection zone 692 further back from the stop bar for left turn lane 681. Detection zone 692 can be positioned in the left hand turn pocket for left turn lane 681. The left hand turn pocket is a location where a third vehicle from the stop bar may be stopped. Accordingly, when sensor 690 detects a target (e.g., vehicle 693) at least partially in detection zone 691 and a target (e.g., vehicle 696) at least partially in detection zone 692, sensor 690 detects an increased likelihood of at least three targets (vehicles) present in left turn lane 681. Detecting three vehicles can be a trigger for activating a left turn arrow for left turn lane 681. Thus, when sensor 690 detects targets in detection zones 691 and 692, a signal controller for intersection 680 can activate the left hand turn arrow for left turn lane 681 on the next cycle.

Although some examples of detections zones have been expressly depicted and described, it should be understood that a large variety of other configurations and combination of detection zones are contemplated. For example, the detection zones of FIGS. 6A and 6B can be combined by using a detection zone similar to detection zone 671 in lane 611. Other detection zones can be also be specifically configured for right hand turn lanes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A traffic sensor for monitoring a roadway intersection, the traffic sensor comprising:
   an antenna array, including:
      a plurality of transmit antennas for transmitting radio frequency (RF) signals into the roadway intersection; and
      a plurality of receive antennas for receiving reflections of the radio frequency (RF) signals reflected off of objects in the roadway intersection, the reflections corresponding to two dimensional image data for the roadway intersection;
   a radio frequency (RF) signal generator for generating radio frequency (RF) signals;
   a receive channel, the receive channel for conditioning received reflections of the radio frequency (RF) signal for compatibility with a processor;
   a processor for processing conditioned reflections corresponding to two dimensional image data for the roadway intersection into a two dimensional image of targets in the roadway intersection.

2. The traffic sensor as recited in claim 1, further comprising RF circuitry that provides a transmit transmission path from the radio frequency (RF) signal generator to the antenna array, and that provides a receive transmission path from the antenna array to the receive channel, wherein the transmit transmission path from the radio frequency (RF) signal generator to the antenna array and the receive transmission path from the antenna array to the receive channel are provided simultaneously.

3. The traffic sensor as recited in claim 2, wherein the RF signal generator comprises an RF signal generator configured to generate an frequency modulated continuous wave (FMCW) modulated radar signal, wherein the RF circuitry comprises one or more mixers to mix the received reflection signals with the generated frequency modulated continuous wave (FMCW) modulated radar signal to create a baseband signal, wherein the receive channel digitizes the baseband signal, and wherein the processor processes the digitized baseband signal to measure range of targets.

4. The traffic sensor as recited in claim 2, wherein the RF circuitry comprises RF switches, the RF switches configured to:
   switch the transmit transmission path from the RF signal generator to the antenna array to each of the individual antennas in the antenna array in sequence such that the transmit transmission path is provided to only one of the antennas in the antenna array at a given time.

5. The traffic sensor as recited in claim 4, wherein the transmit antennas and receive antennas are the same antennas.

6. The traffic sensor as recited in claim 5, wherein the RF circuitry comprises one or more mixers, each mixer in the one or more mixers corresponding to an antenna in the antenna array, each of the one or more mixers configured to participate in simultaneously creating a transmit transmission path from the RF signal generator to the corresponding antenna and a receive transmission path from the corresponding antenna to the receive channel.

7. The sensor as recited in claim 6, wherein the one or more mixers comprise ring mixers, each ring mixer including two diodes positioned appropriately around a circular transmission line structure.

8. The traffic sensor as recited in claim 1, wherein the antenna array comprises antennas with similar beam shapes that are steered to different angles such that the antenna beams overlap.

9. The traffic sensor as recited in claim 1, wherein the antenna array consists of antennas that are manufactured on a printed circuit board.

10. The traffic sensor as recited in claim 9, wherein the antenna array consists of traveling wave series fed microstrip patch antennas.

11. The traffic sensor as recited in claim 9, wherein the antenna array and the one or more mixers are located on the same printed circuit board.

12. The traffic sensor as recited in claim 1, further comprising
one or more computer-readable storage media, having stored thereon computer-executable instructions that, when executed by the processor, cause the sensor to process received signals.

13. The traffic sensor as recited in claim 12, wherein the one or more computer-readable storage media, having stored thereon computer-executable instructions that, when executed by a processor, cause the sensor to process received signals further comprises computer-executable instructions that, when executed, cause the sensor to detect traffic.

14. The traffic sensor as recited in claim 12, wherein the one or more computer-readable storage media, having stored thereon computer-executable instructions that, when executed by a processor, cause the sensor to process received signals further comprises computer-executable instructions that, when executed, cause the sensor to create at least one presence indication.

15. The traffic sensor as recited in claim 12, wherein the one or more computer-readable storage media, having stored thereon computer-executable instructions that, when executed by a processor, cause the sensor to process received signals further comprises computer-executable instructions that, when executed, cause the sensor to generate a traffic statistic.

16. The traffic sensor as recited in claim 12, wherein the one or more computer-readable storage media, having stored thereon computer-executable instructions that, when executed by a processor, cause the sensor to process received signals further comprises computer-executable instructions that, when executed, cause the sensor to generate a traffic count.

17. The traffic sensor as recited in claim 12, wherein the one or more computer-readable storage media, having stored thereon computer-executable instructions that, when executed by a processor, cause the sensor to process received signals further comprises computer-executable instructions that, when executed, cause the sensor to estimate vehicle speed.

18. At a traffic sensor for monitoring a roadway intersection, a method for detecting targets approaching the roadway intersection, the method comprising:
an act of generating a processor controlled radio frequency (RF) signal;
an act of transmitting the radio frequency (RF) signal into the roadway intersection;
an act of receiving reflections of the radio frequency (RF) signal reflected off of objects in the roadway intersection, the reflections corresponding to two dimensional image data for the roadway intersection;
an act of conditioning the received reflections of the radio frequency (RF) signal for compatibility with a processor; and
an act of a processor processing the conditioned reflections corresponding to two dimensional image data for the roadway intersection into a two dimensional image of targets in the roadway intersection.

19. The method as recited in claim 18, further comprising an act of creating a transmit transmission path to transmit the radio frequency signal from a specified antenna in an antenna array.

20. The method as recited in claim 18, further comprising an act of mixing the received reflections with the transmitted radio frequency (RF) signal to generate a baseband signal, wherein the act of conditioning the received reflections comprises an act of digitizing the baseband signal; and wherein the processor processing the conditioned reflections comprises the processor processing the digitized baseband signal.

21. A traffic sensor for monitoring a roadway intersection, the traffic sensor comprising:
one or more printed circuit boards, the one or more printed circuit boards electrically interconnected, the one or more printed circuit boards, including:
an array of traveling wave series fed microstrip patch antennas manufactured into the first printed circuit board, the array of traveling wave series fed microstrip patch antennas including:
transmit antennas for transmitting frequency modulated continuous wave (FMCW) radio frequency (RF) signals into the roadway intersection; and
a plurality of receive antennas for receiving reflections of the frequency modulated continuous wave (FMCW) radio frequency (RF) signals reflected off of objects in the roadway intersection, the reflections corresponding to two dimensional image data for the roadway intersection;
a frequency modulated continuous wave (FMCW) radio frequency (RF) signal generator for generating frequency modulated continuous wave (FMCW) radio frequency (RF) signals;
a multi staged arrangement of a plurality of RF switches for selecting particular traveling wave series fed microstrip patch antennas in the antenna array;
a plurality of mixers, each mixer in the plurality of mixers corresponding to one of the traveling wave series fed microstrip patch antennas, each mixer configured to mix a received reflection of a frequency modulated continuous wave (FMCW) radio frequency (RF) signal with the frequency modulated continuous wave (FMCW) radio frequency (RF) into a baseband signal;
a baseband multiplexer synchronized with the multi staged arrangement of a plurality of RF switches, the baseband multiplexer configured to receive a baseband signal from a mixer when the multi staged arrangement of a plurality of RF switches have selected the particular traveling wave series fed microstrip patch antenna corresponding to the mixer;
analog to digital conversion components for digitizing the baseband signal received from the mixer; and
a processor for processing digitized data corresponding to two dimensional image data for the roadway intersection into a two dimensional image of targets in the roadway intersection.

* * * * *